US012562958B2

(12) United States Patent
Sorrentino et al.

(10) Patent No.: US 12,562,958 B2
(45) Date of Patent: Feb. 24, 2026

(54) METHODS AND APPARATUS FOR QUALITY OF SERVICE ANALYSIS

(71) Applicant: Telefonaktiebolaget LM Ericsson (publ), Stockholm (SE)

(72) Inventors: Stefano Sorrentino, Stockholm (SE); Ricardo Blasco Serrano, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/695,586

(22) PCT Filed: Oct. 1, 2021

(86) PCT No.: PCT/EP2021/077187
§ 371 (c)(1),
(2) Date: Mar. 26, 2024

(87) PCT Pub. No.: WO2023/051940
PCT Pub. Date: Apr. 6, 2023

(65) Prior Publication Data
US 2024/0414050 A1      Dec. 12, 2024

(51) Int. Cl.
*G06F 15/16* (2006.01)
*H04L 41/0816* (2022.01)
(Continued)

(52) U.S. Cl.
CPC ........ *H04L 41/0816* (2013.01); *H04L 41/147* (2013.01); *H04L 41/16* (2013.01);
(Continued)

(58) Field of Classification Search
None
See application file for complete search history.

(56) References Cited

U.S. PATENT DOCUMENTS

| | | | | |
|---|---|---|---|---|
| 6,661,775 B1 * | 12/2003 | Nakayama | ............... | H04L 45/24 |
| | | | | 370/230.1 |
| 2020/0136920 A1 * | 4/2020 | Doshi | ..................... | H04L 41/16 |
| 2023/0345292 A1 * | 10/2023 | Pateromichelakis | ........................ | |
| | | | | H04W 28/0268 |

FOREIGN PATENT DOCUMENTS

| | | |
|---|---|---|
| EP | 3846387 A1 | 7/2021 |
| WO | 2021164857 A1 | 8/2021 |

OTHER PUBLICATIONS

International Search Report and Written Opinion of the International Searching Authority, PCT/EP2021/077187, mailed Jun. 2, 2022, 16 pages.

(Continued)

*Primary Examiner* — Padma Mundur
(74) *Attorney, Agent, or Firm* — Sonoda & Kobayashi Intellectual Property Law; Sarvajit S. Patil

(57) ABSTRACT

Aspects of embodiments provide methods and network nodes for Quality of Service (QoS) analysis in a communications network, wherein the communications network provides coverage for a coverage area. The method may include generating a QoS prediction that specifies one or more Key Performance Indicator (KPI) criteria for the communications network to satisfy in relation to one or more devices at a coordinate within the coverage area. The method may further include analysing the QoS prediction and determining a success metric for the communication network satisfying the QoS prediction based on current network resource allocation. If the success metric that the communications network will satisfy the QoS prediction is acceptable the current network resource allocation may be retained. If the success metric that the communications network will satisfy the QoS prediction is not acceptable the current network resource allocation may be altered.

13 Claims, 7 Drawing Sheets

(51) Int. Cl.

| | |
|---|---|
| *H04L 41/147* | (2022.01) |
| *H04L 41/16* | (2022.01) |
| *H04L 41/5025* | (2022.01) |
| *H04L 43/08* | (2022.01) |
| *H04L 43/16* | (2022.01) |

(52) U.S. Cl.
CPC .......... *H04L 41/5025* (2013.01); *H04L 43/08* (2013.01); *H04L 43/16* (2013.01)

(56) References Cited

OTHER PUBLICATIONS

International Preliminary Report on Patentability of the International Preliminary Examining Authority, mailed Jul. 19, 2023, PCT/EP2021/077187, 24 pages.

* cited by examiner

Fig 3.

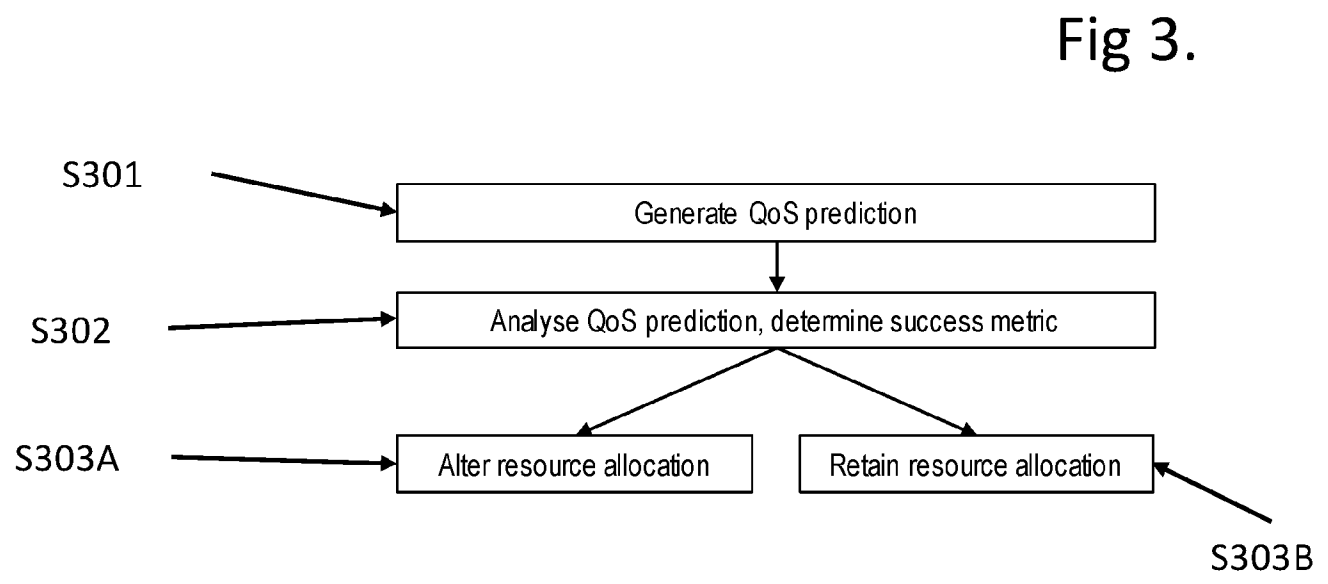

S301 — Generate QoS prediction

S302 — Analyse QoS prediction, determine success metric

S303A — Alter resource allocation

S303B — Retain resource allocation

Fig 4A.

Node

40A

42

41

43

Processor

Memory

Computer Program

Interfaces

METHODS AND APPARATUS FOR QUALITY OF SERVICE ANALYSIS

CROSS-REFERENCE TO RELATED APPLICATIONS

This application is a 35 U.S.C. § 371 national stage application of PCT International Application No. PCT/EP2021/077187 filed on Oct. 1, 2021, the disclosure and content of which is incorporated by reference herein in its entirety.

TECHNICAL FIELD

Embodiments of the present disclosure relate to methods and apparatus for Quality of Service (QoS) analysis, and particularly methods and apparatus for QoS analysis in communication networks providing coverage for coverage areas.

BACKGROUND

The performance of a communication network, such as all or part of a $3^{rd}$ Generation Partnership Project (3GPP) communication network, can be measured in various ways. Uplink or downlink data throughput, latency, latency jitter, service availability, packet loss, and so on may all be used to measure network performance. Network performance impacts the end-user experience in ways which are harder to quantify and measure non-subjectively than the actual network performance. It is common for contracts between network providers and users (such as network operators) to include Quality of Service (QoS) guarantees; the QoS guarantees may contain threshold standards relating to latency, throughput, reliability, security, and so on, where penalties may be imposed upon a network provider that fails to satisfy an agreed QoS guarantee with a network operator. Network operators provide services to users, and therefore may also be referred to as service providers. Different QoS guarantees may be in place with different operators, as agreed in Service Level Agreements (SLAs) with the operators. To monitor and maintain the desired quality of service (QoS), communication networks have specific features and functionalities such as like bearers, flows, admission control, congestion control, etc. The features and functionalities may be collectively referred to as the QoS framework.

The term QoS may be used to refer to two different but related concepts. The first of these concepts is the experienced QoS. The experienced QoS refers to the actual values of the different performance indicators (or key performance indicators, KPIs) that are experienced by a service during a specific execution. As an example of experienced QoS, service A may experience a downlink (DL) throughput of 10 Mbps at time T1 and a DL throughput of 1 Mbps at time T2. The second of the two concepts is the provisioned QoS. The provisioned QoS is the values of the different performance indicators or KPIs that the communications system targets to deliver to a service. As an example of provisioned QoS, the communications system may be provisioned to deliver a downlink throughput of 10 Mbps to service A.

Ideally, the QoS experienced by a service is better than (or at least, not worse than) the provisioned QoS. In practice this is not always the case due to deployment issues, capacity issues, and so on. No matter what QoS framework is used, network performance is ultimately limited by the network deployment; accordingly, network vendors and operators have typically improved the network (for example, by adding more equipment, new functionalities, and so on) to ensure that the provisioned QoS is guaranteed always satisfied. Ensuring provisioned QoS satisfaction through network improvements typically works well for best effort services and for services with relaxed QoS requirements (such as Mobile BroadBand, MBB, services). Services with demanding provisioned QoS requirements may also be successfully supported through network improvements in controlled scenarios (for example, in limited geographical areas such as within a factory). Difficulties arise when it is desired to provide services with demanding provisioned QoS requirements over large areas; this is still a challenge in many networks due at least in part to deployment costs related to implementing network improvements over a large area. A typical use case affected by demanding QoS requirements over a large area is vehicular communication, as may be used in remote or autonomous vehicle applications; this is not surprising given that vehicles typically have high mobility.

SUMMARY

It can be envisioned that in some situations shortages of available network resources due to, for example, damage to network infrastructure or atypically high traffic levels, may mean that it is challenging to simultaneously satisfy all provisioned QoS requirements.

It is desirable to avoid experienced QoSs falling below provisioned QoS, particularly in the case of high priority applications such as remote vehicle control, and so on. Current systems may not adequately ensure provisioned QoS satisfaction, which may result in QoS failures (where experienced QoS falls below provisioned QoS) with potentially severe consequences.

This summary is provided to introduce a selection of concepts in a simplified form that are further described below in the detailed description. This summary is not intended to identify key features or essential features of the claimed subject matter, nor is it intended to be used to limit the scope of the claimed subject matter. For the avoidance of doubt, the scope of the claimed subject matter is defined by the claims.

It is an object of the present disclosure to reduce the likelihood of experienced QoS falling below provisioned QoS requirements.

Embodiments of the disclosure aim to provide methods and apparatus that alleviate some or all of the problems identified above.

The scope of the present invention is defined by the appended claims.

BRIEF DESCRIPTION OF DRAWINGS

For a better understanding of the present disclosure, and to show how it may be put into effect, reference will now be made, by way of example only, to the accompanying drawings, in which:

FIG. 3 is a flowchart illustrating a method in accordance with embodiments;

FIG. 4A is a schematic diagram of a node in accordance with embodiments;

DETAILED DESCRIPTION

For the purpose of explanation, details are set forth in the following description in order to provide a thorough understanding of the embodiments disclosed. It will be apparent, however, to those skilled in the art that the embodiments may be implemented without these specific details or with an equivalent arrangement.

Although, as explained above, it can be challenging to provide services satisfying demanding provisioned QoS requirements over large areas, the degree of challenge may be mitigated where the network services are able to adapt to variations in performance in advance, using advance predictions of changes in (for example) network use. Returning to the example of remote driving, these systems often combine (from the perspective of the remote driving vehicle) the transmission of an uplink video stream and reception of downlink driving commands. Modern video codecs may adapt video stream quality to the available bandwidth, and the entire driving operation may if necessary be changed in some cases. Accordingly, remote driving systems may be adapted in at least the following ways: the speed of the vehicle may be lowered, allowing remote driving to continue with a lower-quality video feed;

and/or the route of the vehicle may be changed to avoid areas with temporary or permanent poor network performance.

It may be desirable to implement predictive QoS, which is the capacity to predict the QoS performance of the network in the future, as a complementary solution to network deployment and densification as means to ensure demanding provisioned QoS requirements may be satisfied. Predictive QoS may be used to predict a given QoS metric (for example, support for a given continuous bitrate) given a set of measurements of the network (also known as features) f. More specifically, predictive QoS may be used to predict a QoS metric Q that a UE can expect at (future) time t in position x given the features f. Where the predicted value of QoS metric Q is $\hat{Q}$, the relationship between Q and f may be codified as shown in Equation 1: $\hat{Q}=g(f,t,x)$ The set of features f may include the time and position values t and x; these values are indicated separately in Equation 1 due to their importance to the calculation of $\hat{Q}$. The function g is predictor function g(.) that puts out a value of $\hat{Q}$ that is as similar as possible (according to some predefined criterion) to the true value Q of the QoS metric of interest. The predefined criterion may be, for example: a numerical comparison, a binary type prediction (is service going to be delivered or not), a multiple outcome condition (are we going to meet 10 Mbps, or between 10-20 Mbps, or above 20 Mbps), and so on.

Figure 1:
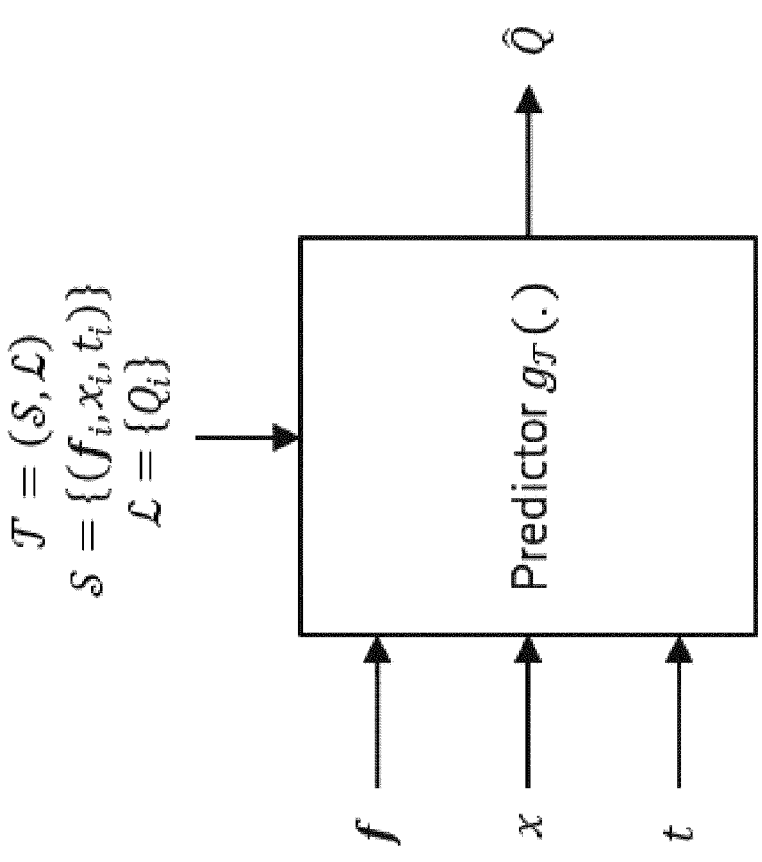
FIG. 1 is a diagram of a process for obtaining predicted QoS values using ML.

Various different methods may be used to determine the predictor function for a given situation; one of the most efficient methods is to utilise Machine Learning (ML) techniques, in particular, supervised learning techniques. In supervised learning, the predictor function g may be derived using a training dataset that contains labelled samples, wherein each sample contains the values of the features f and the true value of the metric of interest Q. The training data set J therefore comprises the features $S=\{(f_1, t_1, x_1), (f_2, t_2, x_2), \ldots, (f_i, t_i, x_i), \ldots\}$ and the corresponding values of the metric $L=\{Q_1, Q_2, \ldots, Q_i, \ldots\}$. The feature values for the training data set, like those used when the ML model is trained to make predictions, may be obtained from any suitable source. Examples of suitable sources include the device to which the prediction relates, other devices in the network, network nodes, and so on. The relationship between the predicted values for Q (that is, $\hat{Q}$) and the prediction function obtained by training a ML model using the data set J may therefore be written as $\hat{Q}=g_J^{(f,t,x)}$. FIG. 1 is a diagram summarising the above process for obtaining predicted values $\hat{Q}$ using ML.

Figure 2:
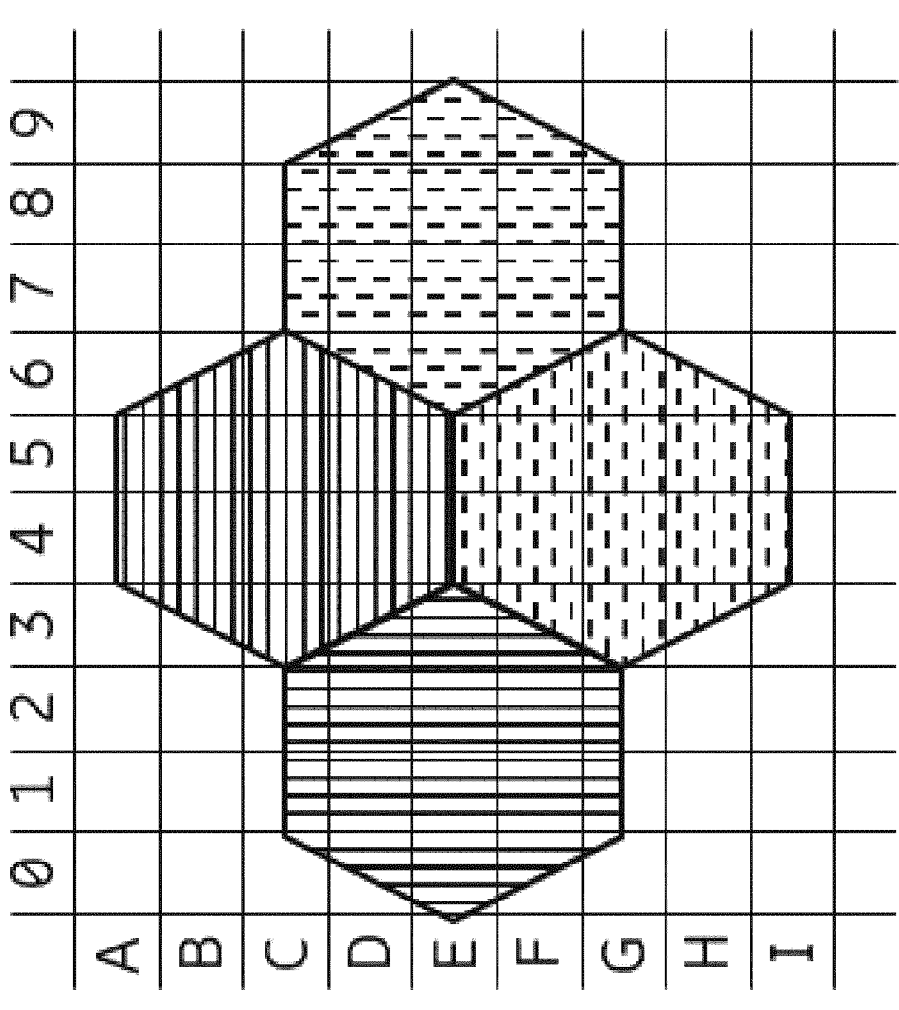
FIG. 2 is a diagram of spatial coverage areas for four base stations.

As discussed above, the value of Q typically varies across the coverage area of the network; accordingly knowledge of the position and time coordinates for which a value of $\hat{Q}$ is to be obtained (that is, the predicted value of the metric Q a device may experience if located at the coordinates) may be required. The granularity with which values of $\hat{Q}$ may be obtained (that is, the granularity of the function g) is not arbitrary, instead it is dependent on factors such as the measurement resolution for the feature values. FIG. 2 shows the spatial coverage areas of four base stations (which may be 4th Generation, 4G, Evolved Node Bs, eNB, or 5th Generation, 5G, next Generation Node Bs, gNBs, for example). The coverage provided by base station 1 is indicated in FIG. 2 by the hexagon with solid vertical lines, the coverage provided by base station 2 is indicated in FIG. 2 by the hexagon with solid horizontal lines, the coverage provided by base station 3 is indicated in FIG. 2 by the hexagon with dashed horizontal lines, and the coverage provided by base station 4 is indicated in FIG. 2 by the hexagon with dashed vertical lines. FIG. 2 also includes a grid rows, labelled with letters A-I, and columns, labelled with numbers 0-9. Each square in the cell is identified by a combination of row and column. For example, A0 is the top left square. Some of the squares are fully located inside the coverage area of a single base station (e.g., E1 is fully located inside the coverage area of base station 1), whereas others are shared between the coverage areas of two or more base stations (e.g., D3 is at the border between the coverage areas of base station 1 and base station 2). Accordingly, if it is intended to provide $\hat{Q}$ value predictions on a per square level, for some of the squares (such as D3), predictor function g would be required to take into account coverage provided by plural base stations. Also, the position of the device for which the $\hat{Q}$ value predictions are to be obtained would be required to an accuracy sufficient to identify which square the prediction was to be made for (which may be the square in which the device is located, or the square in which the device is predicted to be located, for example). The necessary position information may be obtained in any suitable way, for example, using Global Navigational Satellite System (GNSS) information where devices have suitable components, using signal triangulation information, and so on. Another suitable source for position information is the cell ID.

The accuracy provided by ML based predictive QoS systems is largely dependant on the quality and quantity of training data available; to provide good quality results large amounts of detailed training data may be required. Equally, once the ML model has been trained, the data used to make a prediction should also be detailed. Collecting suitable data (for training and for making predictions) may be a problem for many reasons, including hardware limitations and the lack of proper interfaces and exposure functions. In some cases where networks are used by plural network operators, some of the network operators may not be willing to expose information that may reveal insights about their products. In other cases, the data may simply not be available. For these and other reasons, obtaining accurate predictions using predictive QoS systems may be challenging.

Embodiments may provide means for improving the accuracy of predictions obtained from predictive QoS systems. Embodiments may complement accurate prediction with measures to improve the agreement between the actual performance metrics and the predicted ones, by acting on the network resource allocation functionalities. As discussed above, network adjustments (typically improvements) may be utilised to ensure that the provisioned QoS is satisfied. Aspects of embodiments explicitly link network adjustments such as the allocation of network resources to QoS predictions, allowing a network operator (having control of both QoS predictions and resource allocation) to dynamically adapt network resource assignment in order to increase fulfilment of QoS predictions. In this way, the reliability of QoS predictions may be improved and the network may be able to satisfy QoS predictions even in case of poor prediction accuracy by the Prediction Function (as may result from, for example, poor data availability as discussed above).

Figure 4A:
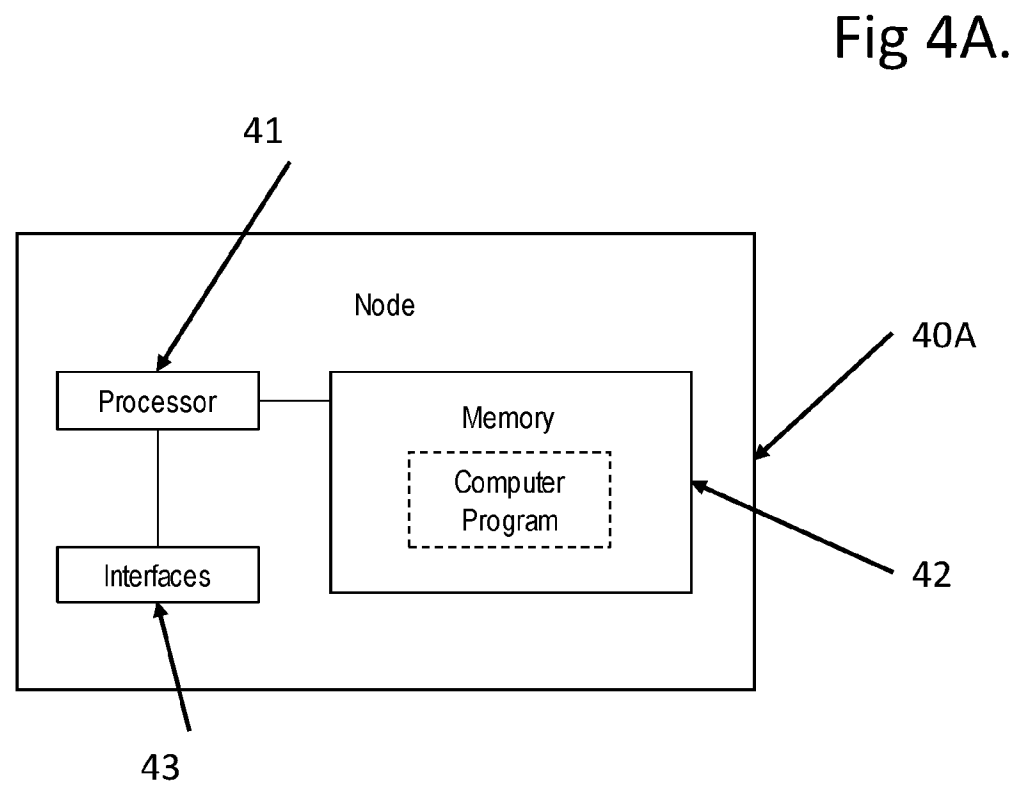
Figure 4B:
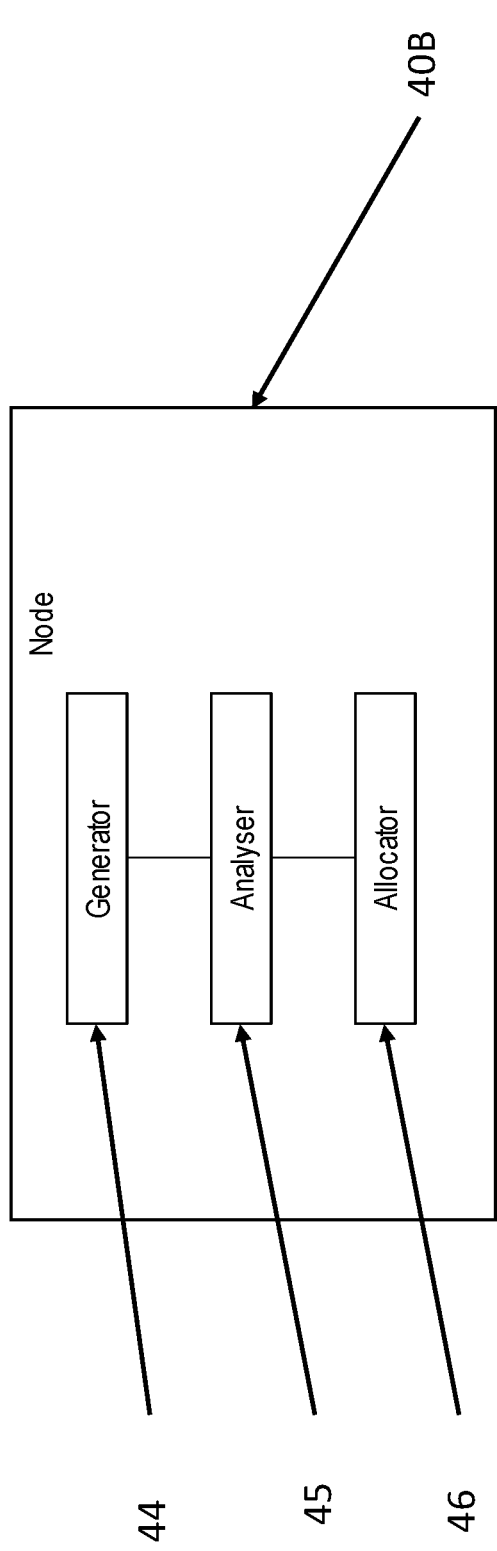
FIG. 4B is a schematic diagram of a node in accordance with further embodiments.

FIG. 3 is a flowchart of a method in accordance with embodiments. The method may be performed by any suitable apparatus. Examples of suitable apparatus for performing the method shown in FIG. 3 are the nodes 40A and 40B shown schematically in FIG. 4A and FIG. 4B respectively; the nodes 40A and 40B may collectively be referred to using reference sign 40. The method may also be performed by any other suitable component or components, such as a further network component. The nodes 40 may be core network nodes or base stations, and/or may be hosted in cloud computing systems. The node 40A as shown in FIG. 4A may execute steps of the method in accordance with a computer program stored in a memory 42, executed by a processor 41 in conjunction with one or more interfaces 43. The node 40B may execute steps of the method using generator 44, analyser 45 and allocator 46. The nodes 40A and 40B may also be configured to execute the steps of other embodiments, as discussed in detail below. Typically, although not necessarily, the node 40 forms part of the communications network for which QoS predictions are to be made.

In step S301, the node 40 generates a QoS prediction that specifies one or more KPI criteria for the communications network to satisfy in relation to one or more devices at a coordinate within the coverage area of the communication network. The coordinates may comprise one or both of: an area within the coverage area (which may be, for example: the entire coverage area of a cell, part of the coverage area of a call, or another geographic area), and a duration of time, to which the QoS prediction relates. The one or more devices may comprise any devices utilising the coverage provided by the communications network; examples include User Equipments (UEs, such as mobile telephones), remote driving vehicles, Internet of Things (IoT) devices, and so on.

In some embodiments, the QoS prediction may be generated using a ML model. Where a ML model is used, this ML model may be trained using supervised learning, wherein the supervised learning uses a training data set comprising training data relating to an area similar to the coverage area. Where collection of suitable data is possible, the training data may be collected by the communications network to which the QoS prediction relates; in situations where this is not possible, the training data may be taken from a further communications network (or further portion of the communication network to which the QoS prediction relates) having similar operating conditions to the communications network to which the QoS prediction relates. In some embodiments, particularly where suitable training data is not available, training data generated using a simulation may be used to supplement or replace training data obtained from communications networks.

The step of generating the QoS prediction may be preceded in some embodiments, and in some of these embodiments may be triggered by, the receipt at the node 40 of a QoS prediction request. The QoS prediction request may be sent by one or more of the one or more devices to which the QoS prediction will relate, and/or may be sent by a network operator. The prediction request may include information useful in the tailoring and generation of the QoS prediction, for example, where the one or more devices include a remote driving vehicle (or more than one), the prediction request may include an expected route to be taken by the remote driving vehicle; this information may be useful in determining the coordinates to which the QoS prediction should relate and may also be used to determine that the remote driving vehicle will require a high reliability of service. The QoS prediction request may also include information on applications to be executed by the one or more devices, for example, the prediction may indicate that a UE intends to or is executing a video streaming application and therefore has specific requirements in terms of bits per second (bps), maximum error probability, maximum delay, maximum delay jitter and so on to support this. More generally, the QoS prediction request may include requests for one or more KPI criteria to be satisfied, for example, that a given device requests a minimum uplink level of 1 Mbps, that a device requests a maximum latency of 2 ms, and so on.

Prior to the step of generating the QoS prediction, the node 40 may obtain parameter information (that is, feature values) relating to the coordinate for use in generating the QoS prediction. The parameter information may be obtained from network devices in a spatial area specified by the coordinates (such as base stations), from devices in said spatial area, and/or from other sources. Examples of the parameter information include: Reference Signal Received Power (RSRP) values measured for the coordinate; Reference Signal Received Quality (RSRQ) values measured for the coordinate; Radio Signal Strength Indicator (RSSI) values measured for the coordinate; Signal plus Interference to Noise Ratio (SINR) values measured for the coordinate; network load values measured for the coordinate; upload and/or download bits per second values for the coordinate; numbers of connected devices in the vicinity of the coordinate, and so on. Where a QoS prediction request is received, this QoS prediction request may trigger the node to obtain the parameter information. The parameter information may additionally or alternatively be collected by the node at regular intervals, such that information is available should a prediction be required.

The QoS prediction generated in step S301 may comprise one or more numerical KPI predictions and/or one or more qualitative KPI predictions. The exact details of what the QoS prediction contains may be determined by the specific communication network configuration, any prediction request received, the available parameter information, and so on. An example of a numerical KPI prediction is "latency=5 ms". Examples of qualitative KPI predictions include "latency below 10 ms" and, where corresponding information has been received in a QoS prediction request, "latency within requested range". Where a node 40A in accordance with the embodiment shown in FIG. 4A is used, the generation of the QoS prediction may be performed in accordance with a computer program stored in a memory 42, executed by a processor 41 in conjunction with one or more interfaces 43. Alternatively, where a node 40B in accordance with the embodiment shown in FIG. 4B is used, the generation of the QoS prediction may be performed by the generator 44.

When the QoS prediction has been generated, in step S302 a success metric is determined for the communication metric satisfying the QoS prediction, based on the current network resource allocation (that is, the resource allocation planned to be allocated to the coordinate to which the QoS prediction relates). In some embodiments, as discussed in greater detail below, the steps of determining the success metric and allocating resources are performed by separate functions (such as a prediction function and a resource allocation function); where this is the case, the prediction may be sent to the resource allocator for analysis. Alternatively, the prediction and resource allocation processes may be performed by the same function. The analysis of the QoS prediction comprises a feasibility assessment; essentially determining whether or not the network resources that are planned to be allocated for the coordinate (for example, location and time) to which the QoS prediction relates mean that the success metric that the communications network will satisfy the QoS prediction is acceptable. An example of the success metric is a probability that the QoS prediction will be satisfied (based on the currently planned network resources); where the success metric is a probability, where the acceptable likelihood for satisfaction may be is determined on a prediction by prediction basis against a probability threshold (for example, a 95% or above likelihood that a QoS prediction will be satisfied may be deemed acceptable for that prediction, while another QoS prediction may require a 99% or above probability of satisfaction). Alternative success metrics for the communication network satisfying the QoS prediction based on current network resource allocation may be used in addition to or alternatively to the probability of success.

An objective of the network provider is to ensure that QoS predictions to devices/network operators are satisfied; this objective may be achieved by ensuring that sufficient network resources are allocated to satisfy the QoS prediction (and reallocating resources if this is not the case), and/or by altering the QoS prediction so that it may be achieved. Where a node 40A in accordance with the embodiment shown in FIG. 4A is used, the analysis of the QoS prediction and subsequent determination may be performed in accordance with a computer program stored in a memory 42, executed by a processor 41 in conjunction with one or more interfaces 43. Alternatively, where a node 40B in accordance with the embodiment shown in FIG. 4B is used, the analysis of the QoS prediction and subsequent determination may be performed by the analyser 45.

If analysis of a QoS prediction indicates that the current allocation of network resources is likely to satisfy the QoS prediction (the success metric is acceptable, for example, the probability is above the threshold for the QoS prediction being satisfied), then the network resource allocation may remain unchanged (see step S303A). Alternatively, if the analysis of the QoS prediction indicates that the success metric is not acceptable (for example, the probability of the QoS prediction being satisfied is not above the threshold), the network resources may then be altered reallocated (see step S303B) with the aim of improving the success metric for the QoS prediction being satisfied. In some embodiments, the alteration of the resource allocation with the aim of improving the success metric for the QoS prediction being satisfied may be at the expense of other devices/ services accessing the network. As an example of this, in order to increase the probability of achieving the predicted QoS, other devices or service providers may be denied or postponed access to network, their data buffer transfer may be postponed, their QoS request may be rejected, and so on.

In some embodiments, in addition or potentially alternatively to reallocating network resources where the success metric is not acceptable, the QoS prediction itself may be altered. The alteration of the QoS prediction may be of particular use where the success metric cannot be increased to an acceptable level even when network resources are reallocated, which may be the case where the QoS prediction does not accurately take into account the capabilities of the network, for example. The alteration of the QoS prediction may take any suitable form based on the nature of the prediction, capacities of the network, and so on. The alteration may be, for example, a reduction in the prediction of a KPI level the network is able to satisfy; returning to the example qualitative KPI predictions of "latency below 10 ms" as discussed above, this may be altered to "latency below 15 ms". Where a node 40A in accordance with the embodiment shown in FIG. 4A is used, the reallocation of network resources (or retention of the current allocation) may be performed in accordance with a computer program stored in a memory 42, executed by a processor 41 in conjunction with one or more interfaces 43. Alternatively, where a node 40B in accordance with the embodiment shown in FIG. 4B is used, the reallocation of network resources (or retention of the current allocation) may be performed by the allocator 46.

In some embodiments, the method further comprises initiating transmission of the QoS prediction. The QoS prediction may be transmitted to at least one of the one or more devices, to a service provider (such as a network operator) that provides a service to at least one of the one or more devices, and so on. Where the QoS prediction is to be transmitted, this may occur at any stage after the QoS prediction has been generated. In particular, the QoS prediction may be transmitted before or after the analysis of the QoS prediction. Ideally, in embodiments where the QoS prediction may be altered as a result of the analysis (as discussed above), the transmission of the QoS prediction may be performed after the analysis and any alterations have taken place. In this way, the need to potentially transmit updated QoS predictions if the QoS prediction is altered, is avoided.

Figure 5:
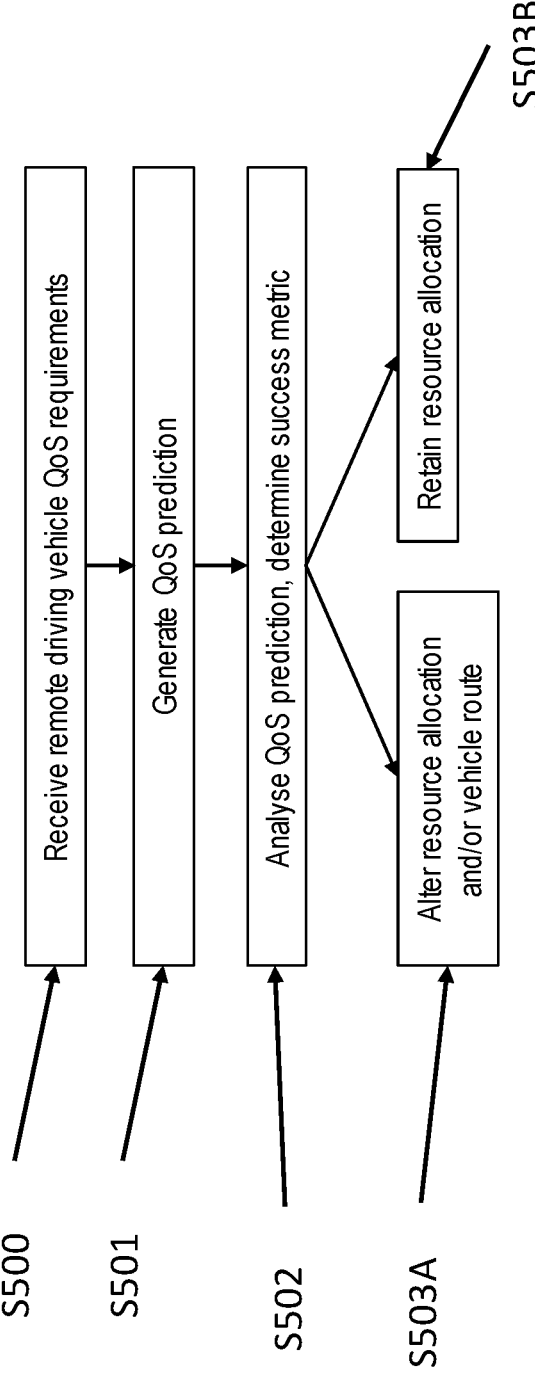
FIG. 5 is a flowchart illustrating a further method in accordance with embodiments.

FIG. 3 illustrates a general method in accordance with embodiments; a method specifically relevant to remote driving vehicles, in accordance with embodiments, is shown in FIG. 5. The method may be implemented by any suitable device, for example, by a node 40 as shown in FIG. 4, which may be embodied as all or part of a remote vehicle controller. For remote driving vehicles, ensuring network coverage of sufficient quality may be of particular importance, as the coverage may be used to implement control of the vehicle and interruptions may lead to loss of vehicle control. Accordingly, in step S500, the method comprises receiving QoS requirements from the remote driving vehicle that specify one or more KPI criteria for the communications network to satisfy in relation to the remote driving vehicle when the remote driving vehicle is within the coverage area. Typically these KPI criteria include maximum latency values, minimum uplink and downlink capacities, avoidance of service interruptions, and so on. Using the KPI criteria (and typically also parameter information obtained as discussed above), a QoS prediction may then be generated as shown in step S501; this step is analogous to the generation of the QoS prediction as shown in step S301 of FIG. 3 and as discussed above, as will be appreciated by those skilled in the art all of the discussion above relating to step S301 applies equally to S501. Following the generation of the QoS prediction, the prediction is then analysed and a determination is made of a success metric for the communication network satisfying the QoS prediction based on current network resource allocation is made (for example, the probability that the communications network will satisfy the QoS prediction based on current network resource allocation), as shown in step S502. Again, step S502 is analogous to step S302, and all of the discussion above relating to step S302 applies equally to S502. The resource allocation may be altered as shown in step S503A (analogous to step S303A) if the success metric is not acceptable (for example, the probability that the communications network will satisfy the QoS prediction is not above the threshold value), or the resource allocation may be retained if the success metric is acceptable (for example, the probability is above the threshold value) as shown in step S530B (analogous to step S303B). In addition or alternatively to altering the resource allocation as shown in step S503A, the route of the remote driving vehicle may be altered; this may be of particular use where, for example, the route of the vehicle can be altered to avoid areas of permanent or temporary lower quality network coverage provision (for example, if a base station is not fully functioning).

Figure 6:
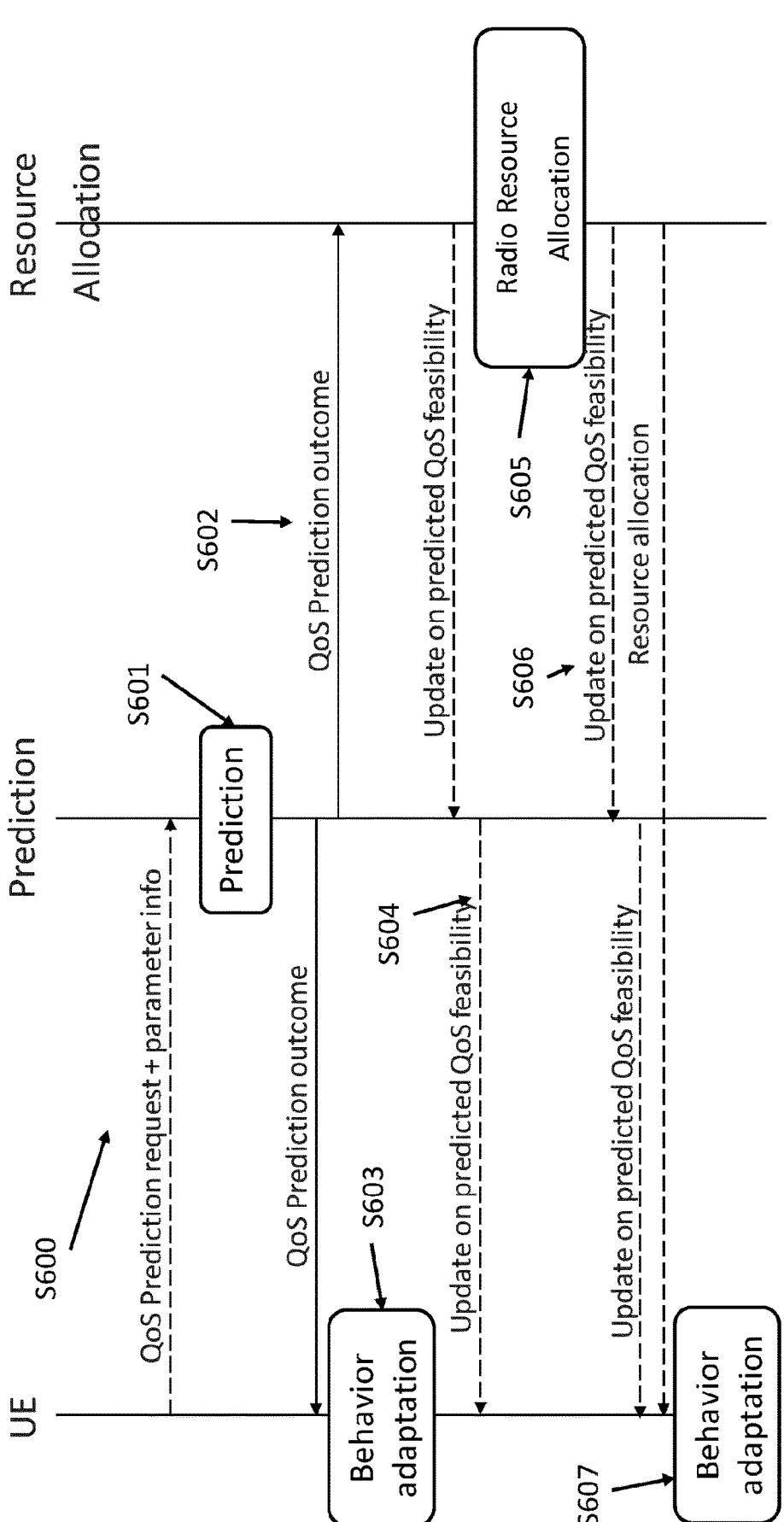
FIG. 6 is a scheduling diagram indicating steps that may be performed in accordance with embodiments.

FIG. 6 is a scheduling diagram of an example method in accordance with embodiments. In the example method shown in FIG. 6, the prediction and resource allocation functions, which may both be performed by a node, are shown separately. In step S600 of FIG. 6 a UE (which is a device from among the one or more devices) sends a QoS prediction request to the prediction function. In the FIG. 6 example, the UE also sends parameter information (that is, feature values) to the prediction function for use in generating the QoS prediction. The QoS prediction request includes information about the service to be provided and/or its associated requirements. The request may indicate, for example, that the UE is interested in operating a video streaming application and/or its requirements in terms of bits per second (bps), maximum error probability, maximum delay, maximum delay jitter, and so on.

In step S601, the prediction function generates a QoS prediction in response to the request, using the information provided by the UE. In the example shown in FIG. 6, a ML model is used to generate the QoS prediction. Subsequently, in step S602, transmission of the QoS prediction is initiated; in the FIG. 6 example, transmission is initiated to the UE prior to the analysis of the QoS prediction, and indeed the QoS prediction is sent to the UE and to the resource allocator for analysis at approximately the same time. The QoS prediction may also be sent to other destinations, such as a service provider, although this is not shown in FIG. 6.

In step S603, the UE adapts its behaviour based on the QoS prediction. As discussed above, where the device is a remote driving vehicle this adaptation could take the form of, for example, rerouting the vehicle to avoid an area of poor network coverage. Continuing with the example discussed above with reference to step S600, a UE interested in operating a video streaming application may reduce the resolution of the streamed video if the QoS prediction indicates that the available bandwidth would not support a high resolution video stream. The QoS prediction is analysed and a determination of the feasibility of the prediction (that is, the acceptability of the success metric) is generated and sent via the predictor to the UE in step S604. The sending of the feasibility information to the UE is optional, but may be of use if the UE is to adapt its behaviour on a short time scale.

At step S605, the radio resource allocation may be altered if the success metric indicates that this is necessary (that is, if the success metric is not acceptable). Examples of resource allocation may include dynamically and temporarily increasing the scheduling priority for a given traffic flow if the considered flow is determined probable to perform below its predicted QoS. Different QoS priorities may be assessed during the resource allocation, so that dynamically adjusting resource allocation priority for flows with a predicted QoS does not negatively affect QoS for other flows which are associated to a higher priority/QoS level. The aim of the resource allocation is to improve the success metric, preferably such that the success metric is reaches an acceptable value as discussed above. Following the alteration of the radio resource allocation, the updated success metric is communicated to the prediction function and to the UE as shown in step S606 (the updated success metric may also be sent to other destinations, such as a service provider, although this is not shown in FIG. 6). The UE may then alter its behaviour based on the updated success metric as shown in S607; continuing with the example wherein the UE is interested in streaming video, the UE may increase the resolution of the streamed video if the resources now allocated would support this.

By linking allocation of network resources to QoS predictions, embodiments allow network operators with control of both QoS predictions and resource allocation to reduce the number of instances of QoS predictions not being satisfied. In this way, the reliability of QoS predictions (from the perspective of network users) may be improved and the network may be able to satisfy QoS predictions even in case of poor prediction accuracy by the Prediction Function (as may result from, for example, poor data availability as discussed above). Embodiments may be of particular use where a guaranteed quality of service is of key importance, such as in remote driving vehicle applications where service issues may impede vehicle control.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. For the avoidance of doubt, the scope of the disclosure is defined by the claims.

The invention claimed is:

1. A method for Quality of Service, QoS, analysis in a communications network, wherein the communications network provides coverage for a coverage area, the method comprising:

generating a QoS prediction that specifies one or more Key Performance Indicator, KPI, criteria for the communications network to satisfy in relation to one or more devices at a coordinate within the coverage area; and analysing the QoS prediction and determining a success metric for the communication network satisfying the QoS prediction based on current network resource allocation, wherein:

if the success metric that the communications network will satisfy the QoS prediction is acceptable the current network resource allocation is retained, if the success metric that the communications network will satisfy the QoS prediction is not acceptable the current network resource allocation is altered;

wherein the method further comprises:

initiating transmission of the QOS prediction, wherein the transmission of the QoS prediction is initiated: to at least one of the one or more devices; and/or to a service provider that provides a service to at least one of the one or more devices; and altering the behaviour of at least one of the one or more devices based on the QoS prediction.

2. The method of claim 1 further comprising, prior to the step of generating the QoS prediction, receiving a QoS prediction request from a device from among the one or more devices, wherein the QoS prediction request includes one or more of:

an expected route to be taken by a device from among the one or more devices;

an application to be executed by a device from among the one or more devices; requests for KPI criteria to be satisfied.

3. The method of claim 1 further comprising, prior to the step of generating the QoS prediction, obtaining parameter information relating to the coordinate for use in generating the QoS prediction, wherein the parameter information comprises one or more of:

Reference Signal Received Power, RSRP, values measured for the coordinate;

Reference Signal Received Quality, RSRQ, values measured for the coordinate;

Radio Signal Strength Indicator, RSSI, values measured for the coordinate;

Signal plus Interference to Noise Ratio, SINR, values measured for the coordinate;

network load values measured for the coordinate;

upload and/or download bits per second values for the coordinate;

numbers of connected devices in the vicinity of the coordinate.

4. The method of claim 1, wherein the coordinate specifies a duration of time and/or geographic area within the coverage area to which the QoS prediction relates.

5. The method of claim 1, wherein the QoS prediction is generated using a Machine Learning, ML, model, and optionally wherein the ML model is trained using supervised learning, the supervised learning utilising a training data set comprising training data relating to an area similar to the coverage area.

6. The method of claim 1, wherein the step of analysing the QoS prediction and determining the success metric comprises modifying the QoS prediction if the analysis indicates that a network resource allocation cannot be modified to satisfy the QOS prediction.

7. The method of claim 1, wherein the QoS prediction comprises a numerical KPI prediction and/or wherein the QoS prediction comprises a qualitative KPI prediction.

8. The method of claim 1, wherein:

the success metric is a probability that the communications network will satisfy the QoS prediction based on current network resource allocation;

the success metric is acceptable if the probability is above a threshold value; and the success metric is not acceptable if the probability is not above the threshold value.

9. The method of claim 1, wherein the one or more devices comprise one or more user equipments and/or one or more remote driving vehicles.

10. A method for Quality of Service, QoS, analysis in a communications network, wherein the communications network provides coverage for a remote driving vehicle in a coverage area, the method comprising:

receiving QoS requirements from the remote driving vehicle that specify one or more Key Performance Indicator, KPI, criteria for the communications network to satisfy in relation to the remote driving vehicle when the remote driving vehicle is within the coverage area;

generating a QoS prediction using the QoS requirements;

analysing the QoS prediction and determining a success metric for the communication network satisfying the QoS prediction based on current network resource allocation, wherein:

if the success metric that the communications network will satisfy the QoS prediction is acceptable the current network resource allocation is retained, if the success metric that the communications network will satisfy the QoS prediction is not acceptable the current network resource allocation is altered and/or a proposed routing of the remote driving vehicle is altered, wherein the method further comprises:

initiating transmission of the QoS prediction, wherein the transmission of the QoS prediction is initiated: to at least one of the one or more devices; and/or to a service provider that provides a service to at least one of the one or more devices; and altering the behaviour of at least one of the one or more devices based on the QoS prediction.

11. A network node in a communications network, wherein the communications network provides coverage for a coverage area, the network node comprising processing circuitry and a memory containing instructions executable by the processing circuitry, whereby the network node is operable to:

generate a Quality of Service, QoS, prediction that specifies one or more Key Performance Indicator, KPI, criteria for the communications network to satisfy in relation to one or more devices at a coordinate within the coverage area; and analyse the QoS prediction and determine a success metric for the communication network satisfying the QoS prediction based on current network resource allocation, wherein:

if the success metric that the communications network will satisfy the QoS prediction is acceptable, the network node is operable to retain the current network resource allocation, if the success metric that the communications network will satisfy the QoS prediction is not acceptable, the network node is operable to alter the current network resource allocation;

wherein the network node is further operable to:

initiate transmission of the QoS prediction, wherein the network node is further operable to initiate transmission of the QoS prediction: to at least one of the one or more devices; and/or to a service provider that provides a service to at least one of the one or more devices; and alter the behaviour of at least one of the one or more devices based on the QoS prediction.

12. A network node in a communications network, wherein the communications network provides coverage for a remote driving vehicle in a coverage area, the network node comprising processing circuitry and a memory containing instructions executable by the processing circuitry, whereby the network node is operable to:

receive Quality of Service, QoS, requirements from the remote driving vehicle that specify one or more Key Performance Indicator, KPI, criteria for the communications network to satisfy in relation to the remote driving vehicle when the remote driving vehicle is within the coverage area;

generate a QoS prediction using the QoS requirements;

analyse the QoS prediction and determine a success metric for the communication network satisfying the QoS prediction based on current network resource allocation, wherein:

if the success metric that the communications network will satisfy the QoS prediction is acceptable the network node is operable to retain the current network resource allocation, if the success metric that the communications network will satisfy the QoS prediction is not acceptable the network node is operable: to alter the current network resource allocation; and/or to alter a proposed routing of the remote driving vehicle;

wherein the network node is further operable to:

initiate transmission of the QoS prediction, wherein the network node is further operable to initiate transmission of the QoS prediction: to at least one of the one or more devices; and/or to a service provider that provides a service to at least one of the one or more devices; and alter the behaviour of at least one of the one or more devices based on the QoS prediction.

13. A non-transitory computer-readable medium comprising instructions which, when executed on a computer, cause the computer to perform a method in accordance with claim 1.

* * * * *